July 16, 1957 B. M. GORDON ET AL 2,799,829

BALANCED MODULATOR

Filed Feb. 19, 1953

INVENTORS
BERNARD M. GORDON
MAURICE A. MEYER

BY Joseph Weingarten
ATTORNEY

United States Patent Office 2,799,829

Patented July 16, 1957

2,799,829

BALANCED MODULATOR

Bernard M. Gordon, Concord, and Maurice A. Meyer, Natick, Mass., assignors to Laboratory for Electronics, Inc., Boston, Mass., a corporation of Delaware Application February 19, 1953, Serial No. 337,742

3 Claims. (Cl. 332—47)

The present invention relates in general to signal modulation systems and more particularly concerns balanced modulator apparatus capable of accepting relatively high level signal inputs and offering a correspondingly high level output with balance and undesired signal suppression to a degree heretofore unavailable.

Broadly speaking, the balanced modulator is operative upon the application of carrier and modulating signals to yield sum and difference side-band frequencies in the absence of either carrier or modulating signal. This is distinguished from the more customary modulator whose output includes both input signals together with the side-band components.

Considerable effort has been directed to development in the balanced modulator art, since these circuits are highly advantageous in specialized communication and other electronic systems. As a result, many useful balanced modulator circuit configurations are in current use and are described in available texts and patents. Perhaps one of the most common and widely used balanced modulator circuits includes a four-arm rectifier bridge energized by the signals to be mixed. In analysis of its operation, the rectifier bridge may be thought of as a switch and the carrier signal as a control over the switching function. Effectively, the switch "chops" the modulating signal with a fifty percent duty cycle at the carrier frequency, which functionally is the equivalent of alternately opening and closing either input or output circuit, or shorting either to ground periodically. Spectral analysis of the output waveform shows it to contain the desired side-bands, the modulating signal and, theoretically at least, no component of the undesired carrier signal. As a practical matter, however, carrier leakage to the output occurs due to imperfect balance of the rectifier bridge arms resulting from the fact that all conducting and all non-conducting impedances of the rectifiers are not commonly precisely equal. As a matter of terminology, the conducting and non-conducting impedances of the rectifier elements are known, and herein referred to, as the forward and back resistances, respectively.

Balanced modulators of this general description may be constructed using various rectifier types, such as vacuum diodes, semi-conductor crystals, selenium, or copper oxide elements. Each type has its advantages and limitations. With vacuum diodes, even though the forward resistance is quite low and the back resistance substantially infinite, critical balance is a difficult problem. In addition, the well known Edison effect tends to establish undesirable circulating currents in the bridge, while relatively high interelectrode capacitances seriously limit the upper frequency. Semi-conductors are particularly advantageous from the viewpoint of long life, small size and weight, moderate cost and in the case of crystals, low shunt capacitance; but these are to a large extent offset by such less desirable characteristics as poor aging characteristics and a lack of initial uniformity, particularly insofar as forward and back resistances are concerned.

When rectifier elements of any of the types noted above are used in conventional balanced modulators, additional inherent restrictions are recognized. For example, the carrier power applied to the rectifier switch must be several times greater than the modulating signal in order to prevent distortion of the output signal. Now then, if the bridge is comprised of crystal diodes or similar low power elements, the applied carrier signal must be sufficiently small to avoid exceeding the diode dissipation capacity. In the case of crystal diodes, such as the commercially available 1N34 or 1N70, the carrier signal applied directly to the switching bridge may not be in excess of approximately two volts rms, and since the modulating signal may be limited to the order of one tenth the carrier for distortionless operation, the modulating signal input is constrained to 0.2 volt. On further analysis, it is seen that if a 0.2 volt modulating signal is used to drive a diode balanced modulator bridge, the amplitude of the desired output side-bands will be even smaller, because of the spectral distribution of signals appearing in the output. Thus, to successfully utilize a conventional balanced modulator bridge circuit even if relatively high amplitude inputs are available, it is first necessary to reduce these signals to values acceptable by the bridge, and then employ additional amplifiers and other auxiliary equipment to raise the level of the modulator output to that required by the particular system. The inefficiency and excessive cost are obvious.

Low level operation is not the sole disadvantage of the conventional bridge balanced modulator. Unbalance of the diode elements in either forward or back directions results in carrier leakage. By a process of selection, it is possible to choose diodes which are balanced in both forward and back directions. However, the aging characteristics of initially similar diodes are not alike, with the result that, in time, a hand-selected group of diodes will no longer exhibit balance, negating the advantage obtained by the time-consuming manual selection procedure.

Numerous attempts have been made to reduce leakage of carrier signal and although some of these attempts have succeeded in improving balance, they have generally done so at a sacrifice of permissible operating level. Consequently, more than the usual amplification was required at the modulator output. But ignoring, for the moment, the reduction of signal output, it was almost universally necessary to achieve a more acceptable degree of balance by critical, manual adjustment initially, and then, from time to time as the components aged.

The present invention contemplates and has as a primary object the provision of a balanced modulator having an intrinsically stable long life requiring no adjustment and which, further, may accept relatively high level input signals to provide an output signal of correspondingly high level with negligible carrier leakage. It is recognized that diode switching in a balanced modulator is a voltage phenomenon. In one aspect of this invention, the switching carrier voltage is increased materially over that used heretofore, but means are provided to insure that the potentials applied directly to the diodes are insufficient to cause destructive dissipation therein. Although a large open circuit carrier voltage is applied to the system for switching purposes, appropriate protective impedances prevent the full switching potential from appearing across the diodes proper. By the introduction of these impedances, the carrier potential used is limited in amplitude only to values which would cause the diodes to break down on inverse voltage. This is found to be of the order of 70 to 100 volts for low cost crystals, and is obviously a marked improvement over the earlier permissible maximum.

In another aspect of the invention, the performance of the diode modulator is further enhanced by substantially perfectly balancing the carrier signal in the back direction. This is achieved in one embodiment through the use of an additional pair of diodes having essentially no effect on the circuit during the forward half cycle of the applied carrier signal, but which introduce a high impedance with respect to the carrier in the back direction. By using hard diodes for these auxiliary elements, no carrier whatsoever appears on the bridge during the inverse half cycle of the carrier, whereby no carrier leakage occurs therein.

It is accordingly another object of the present invention to provide a balanced modulator utilizing a rectifier bridge and auxiliary impedances requiring no adjustment for improving overall modulator balance.

A further object of the present invention is to combine auxiliary diodes with a diode bridge to preclude carrier leakage in the back direction.

A still further object of the present invention is to provide means for operating a balanced modulator at relatively high modulating and carrier signal inputs with a minimum of distortion and carrier leakage.

These and other objects of the present invention will now become apparent from the following detailed specification when taken in connection with the accompanying drawing in which.

Figure 1:
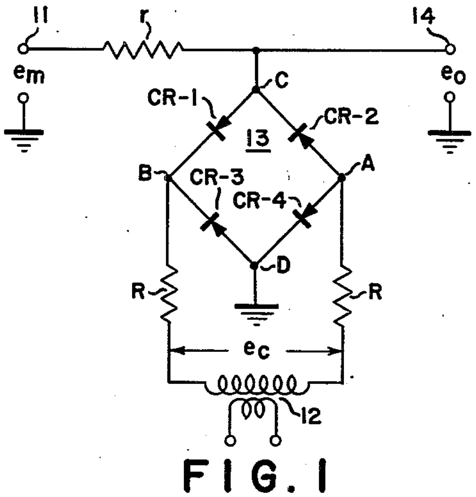
Fig. 1 is a schematic circuit diagram of an embodiment of an improved balanced modulator.

With reference now to the drawing and more particularly to Fig. 1 thereof, there is illustrated a balanced modulator having an input terminal 11 for the application of the modulating signal $e_m$ and an input transformer 12 for the application of a carrier signal. The carrier signal as it appears across the secondary of transformer 12, is of particular interest here since it is the true input, and is designated as $e_c$.

Modulating signal $e_m$ is coupled through an input resistor $r$ to bridge 13 comprised of four crystal diodes CR–1, CR–2, CR–3 and CR–4 poled to conduct in series pairs from point A to point B using conventional current flow designation, as distinguished from electron flow. Junction C between diodes CR–1 and CR–2 is connected to the input resistor and to terminal 14 where the output signal $e_o$ is derived. Junction D between diodes CR–3 and CR–4 is a grounded reference point. Carrier $e_c$ is applied to the bridge between junctions A and B through a pair of substantially equal resistors R, the function of which will be described in considerable detail below.

Arbitrarily, assuming the absence of modulating signal $e_m$, on each half cycle of carrier $e_c$ where point A is positive and point B is negative, all four diodes will conduct. Under these circumstances, point C of the diode bridge is returned to ground through two parallel pairs of conductive diodes. If all four forward resistances are precisely equal; or if the forward resistance of CR–2 is equal to that of CR–4 while at the same time the forward resistances of CR–1 and CR–3 are equal, then a balanced condition obtains, and point C, like point D, will be at ground potential. Hence, terminal 14 will be at ground potential and no carrier leakage exists (other than that which is transferred by any unbalance in the relatively small shunt capacities).

If the forward resistances are all equal, then the impedance from point C to ground will be that of a single conducting diode. When the carrier signal reverses in polarity such that points A and B are negative and positive, respectively, then the diodes are non-conducting and the effective resistance between point C and ground is equal to the back resistance of a single nonconducting diode, if all back resistances are roughly equal.

Figure 2:
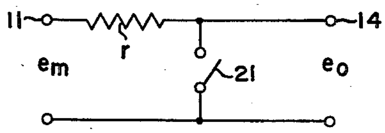
Fig. 2 is a diagrammatic representation of the function of particular circuit elements illustrated in Fig. 1.

Fig. 2 illustrates in elementary fashion the principles which govern the modulation process. Here, the rectifier bridge is replaced by a switch 21, and for purposes of simulating the effect of the carrier signal $e_c$, the switch 21 may be considered as operating at a frequency equal to that of the carrier with a fifty percent duty cycle. Closing the switch shorts the modulating signal to ground through input resistor $r$, while opening the switch connects the modulating signal directly to the output terminal. Resistors R and the forward and back resistances of the diodes of rectifier bridge 13 have been omitted from the simplified representation in Fig. 2.

In a conventional balanced modulator without resistances R as disclosed in Fig. 1, carrier signal would be applied directly to points A and B. For commercially available crystals, a two volt amplitude limitation would be imposed, since additional signal would cause failure of the diodes as noted earlier.

In Fig. 1, when the applied carrier voltage is such as to make points A and B positive and negative, respectively, diode conduction takes place but the voltage appearing between points A and B is less than the carrier voltage by a factor equal to the forward resistance of a single diode divided by 2R. Since the forward resistance of a diode is small, the carrier signal may be raised considerably in level before the voltage on the diodes exceeds the permissible level. There is, in fact, very little limitation on the magnitude of the carrier $e_c$ when considering only the forward direction because resistors R may be selected at a value sufficiently high to reduce the signal between points A and B to a safe value.

It is, however, necessary to consider the effect of the reverse half cycle of the carrier. Since the back resistance of a diode is relatively high, little inverse current flows in the diodes and substantially the full carrier voltage appears between points A and B. Consequently, the diodes would break down if this signal were in excess of the rated back voltage thereof. Thus, the maximum carrier $e_c$ which may be applied is that which is safe from the point of view of back voltage for the crystal type used. The resistors R may be then chosen to permit no more than a safe current magnitude in the forward direction.

It is at once evident that the acceptable carrier voltage level has been raised materially by this arrangement. The possible magnitude of modulating signal $e_m$ is limited, aside from considerations of distortion, to some value less than the carrier $e_c$ to prevent reversal of polarity at point C, which would cut off switch operation. In the novel modulator shown in Fig. 1, the power relations in existence by virtue of resistors R make it possible to raise the level of $e_m$ to slightly less than $e_c$, so that two high level signals may be employed without adversely affecting the modulation process.

Examining the effects of resistors R, it is seen that in the forward direction, a marked degree of balance improvement is obtained because only a small fraction of the carrier appears at points A and B. That is, for a rather large possible increase in applied carrier and modulating signal, and for an equally large output, no more carrier voltage appears on the bridge than in conventional balanced modulators. Since the absolute magnitude of carrier leakage to the output for a given degree of bridge unbalance is determined by the magnitude of the carrier signal available at the bridge itself, the introduction of resistors R materially improves balance while raising allowable signal levels.

But the balance improvement discussed above is primarily realizable only in the forward direction. Resistors R do not materially aid in improving the balance in the back direction, inasmuch as the back resistance of the diodes is much higher than resistors R. It will hence be of assistance if the rectifiers are initially balanced in the forward and back directions. However, it has been observed that if a diode bridge is composed of crystal rectifiers which are initially balanced, this balance is more apt to be retained during aging in the forward direction, but does not so remain in the back direction. Thus, in time, a select rectifier grouping used in the modulator shown in Fig. 1 may develop a degree of unbalance which will contribute carrier leakage. Relative balance may be improved somewhat by shunting equal high resistors across the diodes to minimize the electrical effect of back resistance characteristics variation; however, it is obvious that although an improvement in relative balance may be obtained, lower efficiency is a result.

Figure 3:
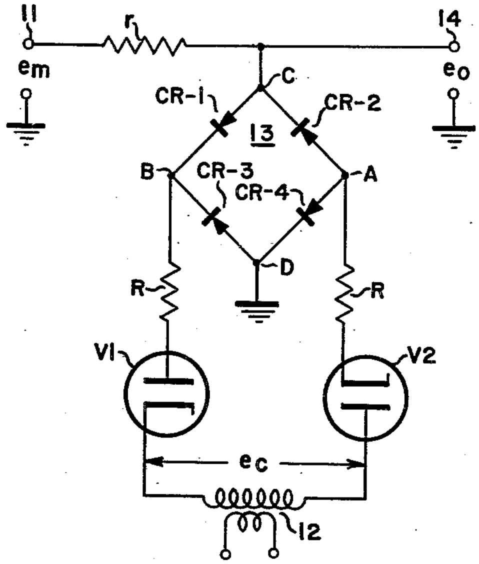
Fig. 3 is a schematic circuit diagram of an embodiment of a balanced modulator of the type generally illustrated in Fig. 1, and including certain additional advantageous features.

In Fig. 3, there is illustrated a balanced modulator circuit which not only makes available the improvements already discussed in connection with Fig. 1, but further, renders the switch nearly perfect in the back direction. Those elements of Fig. 3 which are the same as in Fig. 1 have been similarly identified. The sole modification is the introduction of hard diodes, namely electron tubes V1 and V2, poled as shown in series with resistors R and the input carrier potential $e_c$. When the carrier potential applied is of polarity such that points A and B are positive and negative, respectively, the hard tube diodes are of little consequence, since their conductive resistances are quite low, and the operation of the balanced modulator is substantially identical to that described for the forward direction in connection with Fig. 1. However, in the back direction, the hard tube diodes are nonconductive and are of essentially infinite resistance relative to the back resistance of the crystal rectifiers shown. This substantially blocks the appearance of any carrier potential at points A and B. Consequently, no carrier signal appears at output terminal 14 during the "back" half cycle irrespective of whether the diodes are balanced in this back direction. Thus, resistors R minimize carrier leakage in the forward direction, and tubes V1 and V2 preclude leakage in the back direction.

To illustrate by a representative example the uncommon results obtainable, a modulator constructed in accordance with the circuit shown in Fig. 3, wherein:

| | |
|---|---|
| $r$ | 5,100 ohms. |
| R | 2,200 ohms. |
| CR–1, CR–2 } CR–3, CR–4 } | 1N34A crystal diodes. |
| | One 5829 subminiature twin diode tube. |
| V1 and V2 | 25 volts R. M. S. |
| $e_m$ | 30 volts R. M. S., at frequencies up |
| $e_c$ | to 20 megacycles per second. |

provided a side-band output of approximately 10 volts, with the undesirable carrier signal of the order of 70 to 80 db below the desired side-bands. Such a degree of balance has been hitherto unattainable even at low signal levels; and further, even when manual adjusting means were made available. The upper carrier frequency usable with the advantages noted, is to a large extent determined by the shunt capacities of tubes V1 and V2.

Although Fig. 3 discloses the use of two hard tube auxiliary diodes, similarly poled crystal diodes may be substituted therefor. The resistance of each of these crystals in the back direction is equal to the resistance of any one of the bridge crystals CR–1—CR–4, so that in the back direction, the carrier signal appearing at points A and B will be one-third of the total carrier signal. Under these circumstances, an improvement of approximately eight db in balance over the circuit shown in Fig. 1 would be available.

The techniques herein disclosed for improving the balance of bridge modulators are applicable, not only in the specific embodiments illustrated, but apply equally well to numerous other designs. In both Figs. 1 and 3, the diode switch shunts the output as is illustrated in Fig. 2. In a series switch modulator, the positions of resistor $r$ and switch 21 in Fig. 2 are simply interchanged. Where the diode bridge is a series switch, the principles shown in Figs. 1 and 3 may still be employed. Complex circuits, such as the one known as the doubly balanced bridge, are also readily modified to achieve the benefits noted hereinabove. Utility of the principles of this invention are illustrated in the copending application of Bernard M. Gordon, Serial No. 319,571, entitled Digital Discriminator, and in the copending application of Maurice A. Meyer, Serial No. 329,803, entitled Selective Circuit. The latter application, in particular, shows how these concepts may be adapted to single side-band modulation.

In view of the fact, therefore, that numerous modifications and departures may now be made by those skilled in this electrical art, the invention herein is to be construed as limited only by the spirit and scope of the appended claims.

What is claimed is:

1. A balanced modulator for mixing modulating and carrier signals comprising, a four-arm semi-conductor rectifier bridge having first and second pairs of opposed junctions, said rectifiers being arranged for conduction in two parallel paths between said first pair of junctions, means including a series impedance element for coupling said modulating signal to said second pair of junctions, first and second resistors each having an end joined to a respective one of said first pair of junctions, each of said resistors substantially exceeding the value of the conductive resistance of each of said semi-conductive rectifiers, first and second electron tube diodes each having relatively low resistance during conduction and substantially infinite non-conducting resistance, said first and second electron tube diodes being coupled respectively to the ends of said first and second resistors opposite those ends coupled to said second pair of junctions and being poled for conduction in the direction of conduction through said semi-conductor rectifiers, and means for symmetrically applying said carrier signal to said first and second electron tube diodes at the ends opposite their junction with said first and second resistors.

2. A balanced modulator for mixing modulating and carrier signals comprising, a four-arm semi-conductor rectifier bridge having first and second pairs of opposed junctions, said rectifiers being arranged for conduction in two parallel paths between said first pair of junctions, means for applying said modulating signal to said second pair of junctions, and a pair of impedance elements each having one end joined to a respective one of said first pair of junctions, and means for applying said carrier signal symmetrically to the opposite ends of said impedance elements, each of said impedance elements including a resistor substantially exceeding the value of the conductive resistance of each of said semi-conductive rectifiers and a rectifier element poled for conduction in the direction of conduction through said semi-conductor rectifiers and arranged to limit the application of said carrier signal to said first pair of junctions during alternate half cycles thereof.

3. A balanced modulator for mixing modulating and carrier signals comprising, a four-arm semi-conductor rectifier bridge having first and second pairs of opposed junctions, said rectifiers being arranged for conduction in two parallel paths between said first pair of junctions, means for applying said modulating signal to said second pair of junctions, and a pair of impedance elements each having one end joined to a respective one of said first pair of junctions, and means for applying said carrier signal symmetrically to the opposite ends of said impedance elements, each of said rectifier elements being an electron tube diode having a non-conductive resistance far in excess of the non-conducting resistance of said bridge semi-conductor rectifiers.

References Cited in the file of this patent

UNITED STATES PATENTS

| | | |
|---|---|---|
| 2,293,628 | Reiling | Aug. 18, 1942 |
| 2,455,732 | Carter | Dec. 7, 1948 |
| 2,456,026 | Shenk et al. | Dec. 14, 1948 |
| 2,510,075 | Clavier et al. | June 6, 1950 |